United States Patent [19]

Hsieh et al.

[11] 4,172,980
[45] Oct. 30, 1979

[54] DEVICE FOR DISABLING POWER UNDER CERTAIN SAFETY CONDITIONS

[75] Inventors: Juurong Hsieh, Cleveland; Grant C. Melocik, Chardon, both of Ohio

[73] Assignee: Towmotor Corporation, Mentor, Ohio

[21] Appl. No.: 921,016

[22] Filed: Jun. 30, 1978

[51] Int. Cl.² .............................................. B60K 28/00
[52] U.S. Cl. ...................................... 307/9; 307/116; 361/179; 180/271; 180/273
[58] Field of Search .................... 307/9, 112, 116, 149, 307/154, 326; 361/139, 160, 179, 181, 196, 114; 180/100, 101, 82 R

[56] References Cited

U.S. PATENT DOCUMENTS

| 3,287,608 | 11/1966 | Pokrant | 361/196 X |
| 3,500,946 | 3/1970 | Boyajian | 180/101 |
| 3,838,748 | 10/1974 | Gray et al. | 180/101 |

Primary Examiner—L. T. Hix
Assistant Examiner—James L. Dwyer
Attorney, Agent, or Firm—John L. James

[57] ABSTRACT

Electrical systems (20), such as an electric propulsion system for a vehicle (100) for example, often have electric power available for components of the system (20) when non-operating conditions occur, such as turning off the vehicle key switch (38). An electronic control circuit (10) is provided for controllably interrupting power flow to the system (20) and disabling the system (20) in response to any of a plurality of non-operating conditions.

The electronic control circuit (10) includes a transistor (26) having a base (30), an emitter (28), and a collector (32) and being energized to an on condition in response to the base (30) receiving a preselected signal. The signal is controllably delivered to the base (30) in response to a first switch (38) being open and is controllably delivered to the base (30) a preselected time after a second switch (68) is opened.

16 Claims, 3 Drawing Figures

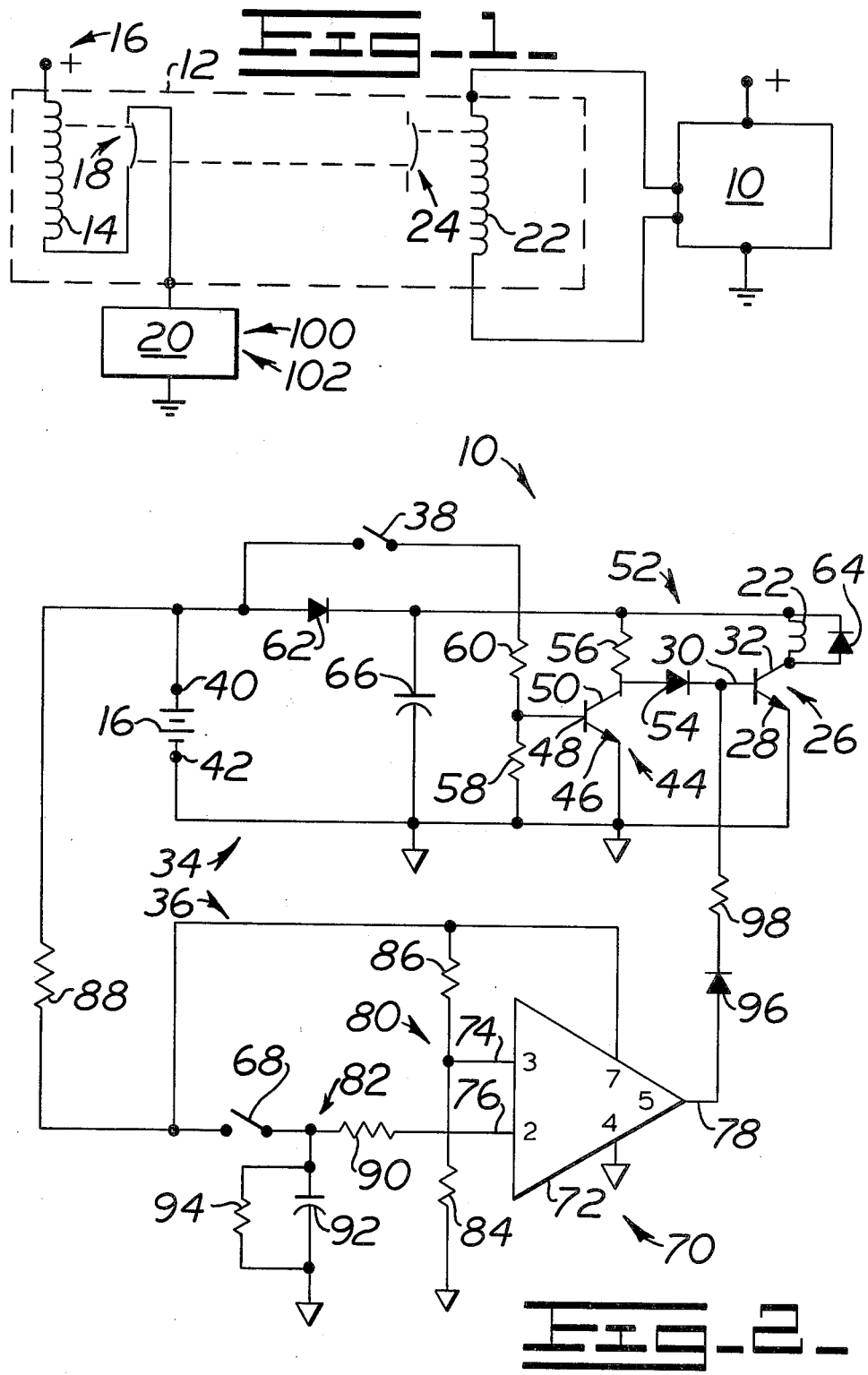

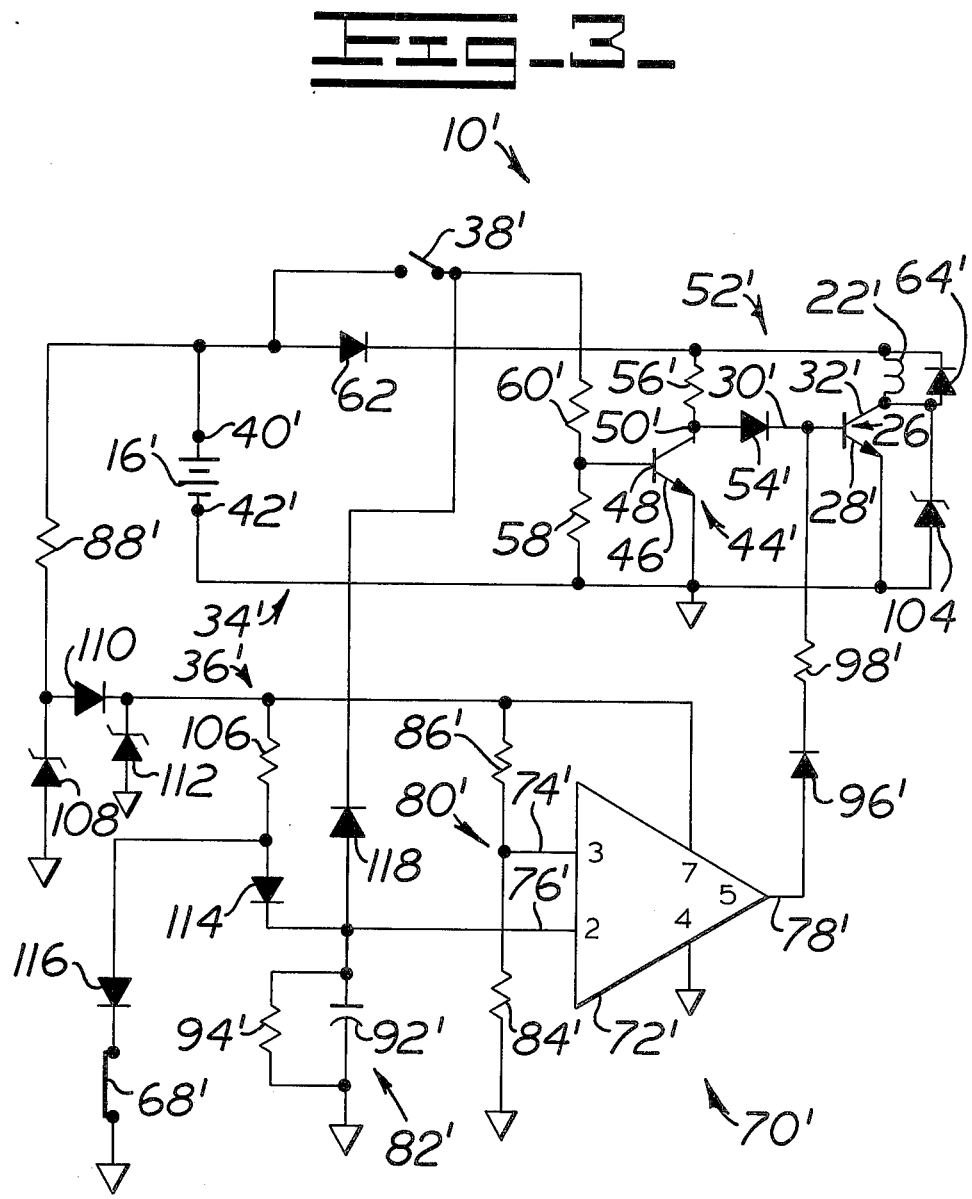

DEVICE FOR DISABLING POWER UNDER CERTAIN SAFETY CONDITIONS

TECHNICAL FIELD

This invention relates to an electronic control circuit for controllably interrupting power flow to an electrical system in response to any one of a plurality of non-operating conditions.

BACKGROUND ART

The electronic control circuit is well suited for controlling a propulsion system of a lift truck or the electrical system of a log chipper and debarker.

In the lift truck, electric power is typically available to the electric drive motors and other components of the propulsion system as well as the lift mast when the key switch or other control switch is opened. It is desirable to positively disconnect the battery or power source from the vehicle systems when the key switch is opened to reduce the electrical hazard and to insure the vehicle systems do not unintentionally operate.

One solution to preventing the propulsion system from unintentionally operating is provided by U.S. Pat. No. 3,507,350 to Myron J. Boyajian dated Apr. 21, 1970. Boyajian uses a seat switch for a vehicle wherein the drive power to the traction means is interrupted upon the operator leaving his operating station and wherein the control prevents unintentional movement of the vehicle upon the return of the operator to his operating station. The seat switch, however, does not interrupt the power flow at the power supply.

In the log chipper and debarker, logs often become lodged and the log chipper cannot operate. When this happens, it is desirable to positively interrupt the flow of power to the log chipper so that the log can be safely removed.

The lift truck and log chipper sometimes have a main circuit breaker which trips and interrupts the current flow only when current of a preselected magnitude flows through the circuit breaker. The circuit breaker positively interrupts the current flow when an overload condition exists, but does not do so when the vehicle or log chipper is merely stopped or when a non-operating condition exists. It is therefore desirable to trip the circuit breaker whenever any one of a plurality of non-operating conditions exists.

DISCLOSURE OF INVENTION

In one aspect of the present invention, an electronic control circuit comprises a transistor which has a base and is energizable to an on condition in response to the base receiving a signal of a preselected magnitude. The signal is delivered to the base in response to a first switch being in an open position. The signal is delivered to the base a preselected time after a second switch is opened.

The electronic control circuit turns on the transistor to trip a circuit breaker in response to any one of a plurality of non-operating conditions to solve the problem of positively separating a power source from an electrical system to thereby eliminate false operation and reduce the electrical hazard.

BRIEF DESCRIPTION OF DRAWINGS

FIG. 1 is a block diagram of an embodiment of the present invention;

FIG. 2 is a schematic diagram of an embodiment of the present invention; and

FIG. 3 is a schematic diagram similar to FIG. 2 but showing another embodiment.

BEST MODE FOR CARRYING OUT THE INVENTION

Referring to FIG. 1, an electronic control circuit 10 is connected to a circuit breaker 12. The circuit breaker 12 has an overcurrent coil 14 connected at one end to a power supply 16 and connected at the other end to load contacts 18. The overcurrent coil 14 and load contacts 18 form a series path for current flow from the power supply 16 to an electrical or electronic system 20 when the load contacts 18 are closed. The load contacts 18 are opened whenever current of a preselected magnitude flows through the coil 14.

The circuit breaker 12 has a trip coil 22 connected to the control circuit 10. Trip contacts 24 open whenever current of a preselected magnitude flows through the trip coil 22. The load contacts 18 and trip contacts 24 are gang operated so that when one of the load and trip contacts 18, 24 opens, the other of the load and trip contacts 18, 24 also opens.

Referring to FIG. 2, the electronic control circuit 10 includes a first transistor 26 which has an emitter 28, a base 30 and a collector 32. The transistor 26 is energizable between an off condition and an on condition at which the emitter 28 and collector 32 for a path for current flow through the transistor 26. The transistor 26 is energized to the on condition in response to the base 30 receiving a trip signal of a preselected magnitude and polarity.

The control circuit 10 also includes first and second means 34,36 for controllably delivering the trip signal to the base 30 of the first transistor 26. The first means 34 includes a first switch 38 which is movable between an open position and a closed position and first and second terminals 40,42 of a size sufficient for receiving power from the power supply 16. The first means 34 delivers the trip signal to the base 30 in response to the first switch 38 being in the open position and in response to one of the first and second terminals 40,42 failing to receive power from the power supply 16.

The first means 34 includes a second transistor 44 which has an emitter 46, a base 48, and a collector 50 and is energizable between an on condition and an off condition at which the first transistor 26 is turned on; and means 52 for coupling the second transistor 44 to the first transistor 26, first switch 38, and first and second terminals 40,42 for controllably biasing the second transistor 44 to the on condition and biasing the second transistor 44 to the off condition in response to the first switch 38 being open and in response to one of the first and second terminals 40,42 failing to receive power from the power supply 16.

The coupling means 52 includes a diode 54 having its anode connected to the collector 50 of the second transistor 44 and its cathode connected to the base 30 of the first transistor 26. A first resistor 56 is connected at one end to the collector 50 of the second transistor 44 and coupled at the other end to the collector 32 of the first transistor 26.

The coupling means 52 also includes a second and third resistor 58,60 each connected at one end to each other and to the base 48 of the second transistor 44. The other end of the second resistor 58 is connected to the second terminal 42 and the emitters 28,46 of the first and second transistors 26,44. The other end of the third resistor 60 is serially connected to the first switch 38.

A second diode 62 has its anode connected to the first terminal 40 and first switch 38 and its cathode connected to the first resistor 56. A third diode 64 has its anode connected to the collector 32 of the first transistor 26 and its cathode connected to first resistor 56 and cathode of the second diode.

A first capacitor 66 is connected at one end to the cathodes of the second and third diodes 62,64 and first resistor 56 and connected at the other end to the second terminal 42, second resistor 58 and the emitters 28,46 of the first and second transistors 26,44. The capacitor 66 charges through the second diode 62 and discharges through the first resistor 56 and first diode 54 in response to one of the first and second terminals 40,42 failing to receive power from the power supply 16.

The trip coil 22 and trip contacts 24 are preferably connected in parallel with the third diode 64. The trip coil 22 can be connected to the emitter 28 rather than the collector 32, but the collector 32 is preferred since more current flows through the collector 32 than through the emitter.

When the first switch 38 is closed and the terminals 40,42 are connected to the power supply 16, the second transistor 44 is biased to the on condition, the first transistor 26 is biased to the off condition and the trip coil 22 is not energized. When the first switch 38 opens, the second transistor base 48 goes negative turning off the second transistor 44. The first transistor base 30 goes positive turning on the first transistor 26 and energizing the trip coil 22 to positively disconnect the power supply 16 from the electrical system 20.

When one of the terminals 40,42 is disconnected from the power supply 16 when the first switch 38 is closed, the bias is removed from the second transistor 44 turning the second transistor 44 off. The first capacitor 66 begins to discharge through the first resistor 56 and first diode 54 to bias the first transistor 26 to the on condition and energize the trip coil 22.

The second means 36 includes a second switch 68 which is movable between an open position and a closed position. The second means 36 controllably delivers the trip signal to the base 30 of the first transistor 26 a preselected time after moving the second switch 68 to the open position.

The second means 36 also includes a means 70 for comparing a variable signal to a fixed signal and generating the trip signal in response to the variable signal being less than a preselected value. The variable signal is less than the preselected value only when the second switch 68 is open.

The comparing-generating means 70 includes an operational amplifier 72 having a fixed signal input 74, a variable signal input 76 and an output 78; means 80 for generating the fixed signal; and means 82 for generating the variable signal.

The means 80 for generating the fixed signal includes a fourth resistor 84 which has one end connected to the second terminal 42 and the other end connected to the fixed signal input 74. A fifth resistor 86 has one end connected to the fixed signal input 74 and the other end connected to the second switch 68 and coupled to the first terminal 40 by a dropping resistor 88 which reduces the voltage of the power supply 16 to a level compatable with the operational amplifier 72.

The second switch 68 is in series with a sixth resistor 90 which is connected to the variable signal input 76 of the operational amplifier 72.

The means 82 for generating the variable signal includes a second capacitor 92 which is connected at one end to the second terminal 42 and connected at the other end to the second switch 68 and sixth resistor 90 and a seventh resistor 94 connected in parallel to the second capacitor 92. The seventh resistor 94 is preferably a variable resistor which, when varied, predictably varies the discharge time of the second capacitor 92. The second capacitor 92 charges when the second switch 68 is closed and discharges through the sixth resistor 94 when the second switch 68 is opened and delivers the variable signal to the variable input 76 of the operational amplifier 72.

A fourth diode 96 has its anode connected to the output 78 of the operational amplifier 72 and its cathode connected to one end of an eighth resistor 98. The other end of the eighth resistor 98 is connected to the base 30 of the first transistor 26 and delivers the trip signal to the base 30. The resistor 98 reduces the output voltage of the operational amplifier 72 to a level sufficient for biasing the base 30 and turning the first transistor 26 on.

When the second switch 68 is closed, the second capacitor 92 charges and a voltage signal is applied to the variable signal input 76 through resistor 90 and a voltage signal is applied to the fixed signal input 74 through resistor 86. When the second switch 68 is opened, the capacitor 92 begins to discharge through resistor 94 and applies a positive voltage signal to the resistor 90 and to the variable signal input 76. As the capacitor 92 discharges the positive voltage decreases and when the positive voltage falls below a preselected value, the operational amplifier produces an output which is applied to the base 30 of the first transistor 26 to energize the trip coil 22. By varying the value of the resistor 94 or the capacitor 92, the positive signal is made to fall below the preselected value after a predetermined period of time. Thus, the trip signal is generated a preselected time after the opening of the second switch 68.

Referring to FIG. 3, the control circuit 10 of FIG. 1 has been modified so that it trips the circuit breaker 12 under if the key switch 38' opens, the seat switch 68' opens, or the battery 16' is connected with the key switch 38' open or the seat switch 68' open. The capacitor 66 of the first means 34 of FIG. 1 has been removed and a protection diode 104 has been connected across the first transistor 26' with its anode grounded.

The second means 36 of FIG. 1 has been modified by removing resistor 90, changing the location of the seat switch 38 and adding resistor 106 and diodes 108,110,112, 114,116, and 118. The operational amplifier 72' has its output 78' connected through diode 96' and resistor 98' to the base 28' of the first transistor 26'. The fixed input 74' is connected to one end of resistors 84' and 86' with the other end of resistor 84' being grounded. The other end of resistor 86' is connected to the cathode of diodes 110 and 112 and to one end of resistor 106. The other end of resistor 106 is connected to the anodes of diodes 114 and 116 with the cathode of diode 114 connected to diode 118, capacitor 92', resistor 94' and the variable input 76' of the amplifier 72'. Resistor 94' and capacitor 92' are connected in parallel to ground and the cathode of diode 118 is connected to key switch 38' and resistor 60'. The cathode of diode 116 is connected to normally closed seat switch 68 which is grounded. The anode of diode 110 is connected through resistor 88' to the battery 16' and is also connected to the cathode of diode 108. The anodes of diodes 108 and 112 are grounded.

In a preferred embodiment of the electronic circuit 10 the main components were as follows:

| Element | Reference No. | Model |
|---|---|---|
| Op Amp | 72 | CA 3160 |
| Transistor | 26 | TIP 122 |
| Transistor | 44 | 2N3643 |
| Diodes | 54, 62, 64, 96, 110, 114, 116 | each 1N4005 |
| Zener diodes | 104, 108, 112 | 12 V, 1 Watt |
| diode | 118 | 1N4598 |
| coil | 22 | 18–50 volt |
| capacitor | 92 | 10 f 20 V |
| capacitor | 66 | 150 f 100 V |

| ¼ Watt Resistors | Value in Ohms |
|---|---|
| 58 | 22 K |
| 60 | 15 K |
| 84 | 1.8 K |
| 86 | 8.2 K |
| 94 | 15 M |
| 106 | 1 k |

| Resistors | Value in Ohms | Watts |
|---|---|---|
| 56, 98 | 6.8 K | ½ |
| 88 | 44 | 100 |
| 90 | 1 K | 2 |

Industrial Applicability

Referring to FIGS. 1 and 2, the electronic control circuit 10 is useful for controllably interrupting the power flow from the power supply 16 to the electrical systems 20 of an electric powered vehicle, such as an electric fork lift truck 100 for example. In this industrial application, the power supply 16 is the lift truck battery, the first switch 38 is the key or ignition switch and the second switch 68 is a seat switch. Thus, the first switch 38 is opened when the ignition key is removed or the ignition is switched off and the second switch 68 is opened when the vehicle operator leaves the vehicle seat. The switches 38,68 are open when it is not intended to operate the vehicle 100.

During normal operation, the terminals 40,42 are connected to the battery 16, the seat switch 68 is closed and the key switch 38 is closed. Current flows from the battery 16 to the first terminal 40, through diode 62 and charges the capacitor 66. Positive battery is applied through the diode 62 to the resistor 56, diode 64 and trip coil 22. Negative battery is applied to the resistor 58 and transistor emitters 28,46. Current flows through the key switch 38, and resistors 60 and 58 biasing the second transistor 44 for operation.

The second transistor 44 turns on and current flows through the resistor 56 and second transistor 44. The voltage drop across the second transistor 44 is insufficient to bias the first transistor 26 through diode 54 when the second transistor 44 is on so the first transistor 26 is off and the trip coil 22 is not energized.

Current also flows from the battery 16 to the first terminal 40, resistor 88, the seat switch 68 and charges the second capacitor 92. Positive voltage is applied to the variable signal input 76 of the operational amplifier 72 through resistor 90. Current flows from the resistor 88 to resistors 86 and 84 applying a preselected positive potential to the fixed signal input 74 of the operational amplifier 72. The amplifier 72 is also connected to the second terminal 42 and receives power through the dropping resistor 88.

During normal operation, the seat switch 68 is closed and the voltage level at the variable signal input 76 is greater than the voltage level at the fixed signal input 74; thus, the output 78 is zero. Since the output 78 is zero, it is insufficient to bias the first transistor 26 to energize the trip coil 22.

Opening the key switch 38, which is a non-operating condition, removes the signal from the base 46 of the second transistor 44 turning the second transistor 44 off. Positive potential is now applied through the diodes 62,54 and resistor 56 to the base 30 of the first transistor 26 turning the first transistor 26 on and energizing the trip coil 22. The trip coil 22 simultaneously opens the trip contacts 24 and load contacts 18 to disconnect the battery 16 from the vehicle systems 20. This prevents unintentional operation of the vehicle system 20.

Disconnecting one or both of the terminals 40,42 from the battery 16, which is a non-operating condition, interrupts the charging path for the first capacitor 66 and the capacitor 66 begins to discharge. As the capacitor 66 begins to discharge, the capacitor 66 applies positive potential to the trip coil 22 and collector 32 of the first transistor 26 and also applies positive potential to the base 30 through the resistor 56 and diode 54 to bias the first transistor 26 to the on condition. The blocking diode 62 prevents the capacitor 66 from discharging through the key switch 38 and resistors 60 and 58. The capacitor 66 turns on the transistor 26 and discharges through the emitter-base circuit. The collector current flows through the trip coil 22 thereby energizing the trip coil 22 to insure that battery 16 remains disconnected from the vehicle systems 20 when the terminals 40,42 are again connected to the battery 16 until the circuit breaker 12 is manually reset.

When the operator leaves his seat thereby opening the seat switch 68, which is a non-operating condition, the second capacitor 92 begins to discharge through resistor 94. The battery 16 and terminals 40,42 are still connected so that a fixed signal is applied to the fixed signal input 74 of the operational amplifier 72. As the capacitor 92 discharges the signal applied through the resistor 90 to the variable signal input 76 of the operational amplifier 72 decreases. When the capacitor 92 is sufficiently discharged, the signal at the variable signal input 76 is less than the signal at the fixed signal input 74 and a signal appears at the output 78. The discharge time of the capacitor 92 is varied according to capacitance of 92 and resistance of 94. This delay of time is desirable to prevent tripping of the circuit breaker 12 when the operator is merely bounced up off the seat momentarily and/or leaves truck for a given limited time.

The trip signal is routed from the output 78 through the diode 96 and resistor 98 to the base 30 of the first transistor 26 where it biases the base 30 tp turn the transistor 26 on thereby tripping the breaker 12.

The electronic control circuit is also useful for controllably interrupting the power flow from the power supply 16 to the electrical systems of a log chipper and debarker 102. In this industrial application, the first switch 38 is the start switch for the log chipper 102 and the second switch 68 is a switch that signals when a log is stuck in the log chipper. By positively disconnecting the power supply 16 from the log chipper electrical system 20, the electronic control circuit 10 prevents unintentional starting of the log chipper 102 when a log is dropped jarring the start switch 38 or other similar events occur. By having the time delay, the log chipper 102 is not stopped unnecessarily when a log momentarily jams the log chipper 102.

Referring to FIG. 3, during normal operation, the seat switch 68' is open and the key switch 38' is closed. With key switch 38' closed transistor 44 is turned on and transistor 26 is turned off and the trip coil 22 is not energized. Upon closing key switch 38' with seat switch 68' open meaning the operator is seated, current flows through resistor 88', diode 110, resistor 106, diode 114 and resistor 94' and capacitor 92' charging capacitor 92'. The charged capacitor keeps input 76' high preventing amplifier 72 from turning on transistor 26. If the operator is now seated the current takes the path of least resistance from resistor 106 to diode 116 and capacitor 92' does not charge. The input signal to input 76 goes low, the output 78 goes high and turns on transistor 26 which energizes trip coil 22.

When capacitor 92' is charged and the operator leaves his seat, seat switch 68' closes and shunts current through resistor 106 to ground. Capacitor 92' will begin to discharge through resistor 94' and after a preselected time will trigger amplifier 72' to turn on transistor 26 and energize the trip coil 22.

When, during operation with seat switch 68' closed, the key switch 38' is opened, transistor 44 turns off and transistor 26 turns on to energize the trip coil.

If the battery 16' is disconnected during normal operation with both switches 38' and 68' open, capacitor 92' discharges through diode 118 and resistors 58' and 60'. This prevents the battery 16' from being immediately reconnected without energizing the trip coil 22 because when capacitor 92' discharges the output of amplifier 72' turns on transistor 26 to energize trip coil 22.

Other aspects, objects and advantages of this invention can be obtained from a study of the drawings, the disclosure and the appended claims.

What is claimed is:

1. An electronic control circuit (10), comprising:
   a transistor (26) having an emitter (28), base (30) and collector (32), and being energizable between an off condition and an on condition at which the emitter (28) and collector (32) form a path for current flow through the transistor (26), said transistor (26) being energized to the on condition in response to the base (30) receiving a signal of a preselected magnitude and polarity;
   first means (34) for controllably delivering the signal to the base (30), said first means (34) including a first switch (38) movable between an open position and a closed position and first and second terminals (40,42) of a size sufficient for receiving power from a power supply (16), said first means (34) delivering the signal to the base (30) in response to the first switch (38) being in the open position, said first means (34) including a second transistor (44) having an emitter (46), a base (48) and a collector (50) and being energizable between an on condition and an off condition at which the first transistor (26) is turned on and means (52) for coupling the second transistor (44) to the first transistor (26), first switch (38), and first and second terminals (40,42) for biasing the second transistor (44) to the on condition and biasing the second transistor (44) to the off condition in response to the first switch (38) being open and in response to one of the first and second terminals (40,42) failing to receive power from the power supply (16); and
   second means (36) for controllably delivering the signal to the base (30), said second means (36) including a second switch (68) movable between a normal position and an actuated position, said second means (36) delivering the signal to the base (30) a preselected time after moving the second switch (68) to the actuated position.

2. An electronic control circuit (10), as set forth in claim 1, including a trip coil (22) connected in series with one of the emitter (28) and collector (32), and being controllably energized in response to the base (30) receiving the signal.

3. An electronic control circuit (10), as set forth in claim 1, wherein the coupling means (52) includes a diode (54) connected to the collector (50) of the second transistor (44) and base (30) of the first transistor (26).

4. An electronic control circuit (10), as set forth in claim 1, wherein the coupling means (52) includes a first resistor (56) connected to the collector (50) of the second transistor (44) and coupled to the collector (32) of the first transistor (26).

5. An electronic control circuit (10), as set forth in claim 4, including a trip coil (22) connected to the collector (32) of the first transistor (26) in series with the first resistor (56) and a diode (64) connected in parallel with the trip coil (22).

6. An electronic control circuit (10), as set forth in claim 4, including a trip coil (22) connected at one end to the collector (32) of the first transistor (26) and connected at the other end to the first resistor (56);
   a second diode (62) connected to the first terminal (40) and to the trip coil (22) and first resistor (56); and
   a capacitor (66) connected to the second terminal (42) and to the second diode (62), first resistor (56), and trip coil (22), said capacitor (66) charging through the second diode (62) and discharging through the first resistor (56) and first diode (54) and through the trip coil (22) in response to one of the first and second terminals (40,42) failing to receive power from the power supply (16).

7. An electronic control circuit (10), as set forth in claim 1, wherein the coupling means (52) includes a second resistor (58) connected to the second terminal (42) and base (48) of the second transistor (44); and
   a third resistor (60) connected to the second resistor (58) and base (48) of the second transistor (44) and to the first switch (38), said first switch (38) being connected to the first terminal (40).

8. An electronic control circuit (10), as set forth in claim 1, wherein the second means (36) includes means (70) for comparing a variable signal to a fixed signal and generating the preselected signal in response to the variable signal being less than a preselected value, said variable signal being less than the preselected value only when the second switch (68) is open.

9. An electronic control circuit (10), as set forth in claim 8, wherein the comparing means (70) includes an operational amplifier (72) having first and second inputs (74,76) and an output (78) and means (80) for generating the fixed signal and means (82) for generating the variable signal.

10. An electronic control circuit (10), as set forth in claim 9, wherein the means (80) for generating the fixed signal includes a resistor (86) connected to the first input

(74) of the operational amplifier (72) and coupled to the first terminal (40).

11. An electronic control circuit (10), as set forth in claim 9, wherein the means (82) for generating the variable signal includes a capacitor (92) connected to the second terminal (42) and connected to the second switch (68) and second input (76) of the operational amplifier (72) and a resistor (94) connected to the capacitor (92) in parallel, said capacitor (92) charging when the second switch (68) is closed and discharging through the resistor (94) when the second switch (68) is opened and delivering a signal to the second input (76) of the operational amplifier (72) while discharging.

12. An electronic control circuit (10), as set forth in claim 1, wherein the second means (36) includes means (70) for comparing a variable signal to a fixed signal and generating the preselected signal in response to the variable signal being less than a preselected value, said variable signal being less than the preselected value only when the second switch (68) is closed.

13. An electronic control circuit (10), as set forth in claim 12, wherein the comparing means (70) includes an operational amplifier (72) having first and second inputs (74,76) and an output (78) and means (80) for generating the fixed signal and means (82) for generating the variable signal.

14. An electronic control circuit (10), as set forth in claim 13, wherein the means (82) for generating the variable signal includes a capacitor (92) connected to the second terminal (42) and connected to the second switch (68) and second input (76) of the operational amplifier (72) and a resistor (94) connected to the capacitor (92) in parallel, said capacitor (92) charging when the second switch (68) is open and discharging through the resistor (94) when the second switch (68) is closed and delivering a signal to the second input (76) of the operational amplifier (72) while discharging.

15. An electronic control circuit (10), as set forth in claim 1, including a circuit breaker (12) having an overload coil (14) and a trip coil (22), said overload coil (14) being connected in series with an electrical system (20) and interrupting current flow to the electrical system (20) in response to current flow of a preselected magnitude through the overload coil (14), said trip coil (22) being connected to the transistor (26) and interrupting current flow to the electrical system (20) in response to the base (30) of the transistor (26) receiving the signal.

16. An electronic circuit (10), as set forth in claim 1 wherein the first means (34) delivers the signal to the base (30) in response to one of the first and second terminals (40,42) failing to receive power from the power supply (16).

* * * * *